I. N. MYERS.
FRICTION TRANSMISSION GEAR.
APPLICATION FILED JAN. 9, 1918.

1,270,651.

Patented June 25, 1918.

Inventor:
Isaac N. Myers,
by Hazard & Miller
Attys.

UNITED STATES PATENT OFFICE.

ISAAC N. MYERS, OF GLENDALE, CALIFORNIA.

FRICTION TRANSMISSION-GEAR.

1,270,651.  Specification of Letters Patent.  Patented June 25, 1918.

Application filed January 9, 1918. Serial No. 211,047.

*To all whom it may concern:*

Be it known that I, ISAAC N. MYERS, a citizen of the United States, residing at Glendale, in the county of Los Angeles and State of California, have invented new and useful Improvements in Friction Transmission-Gears, of which the following is a specification.

My object is to make a friction transmission gear for automobiles and the like and provide convenient means for varying the speed and reversing the drive, and mount the entire mechanism in a gear case, so that it may run submerged in oil.

Figure 1:
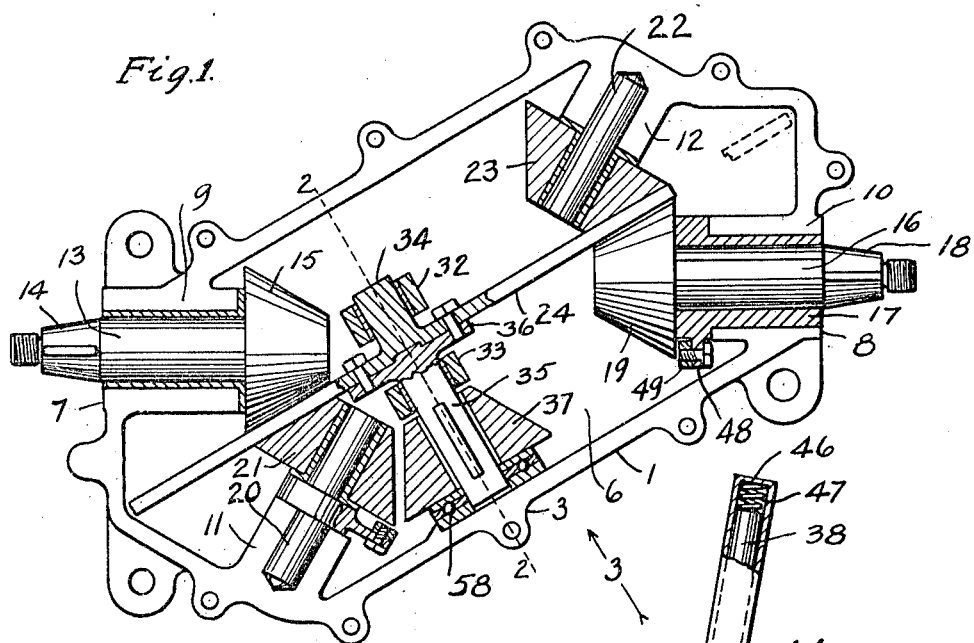
Figure 1 is a plan of the friction transmission gear embodying the principles of my invention, with the upper half of the case removed.
Figure 2:
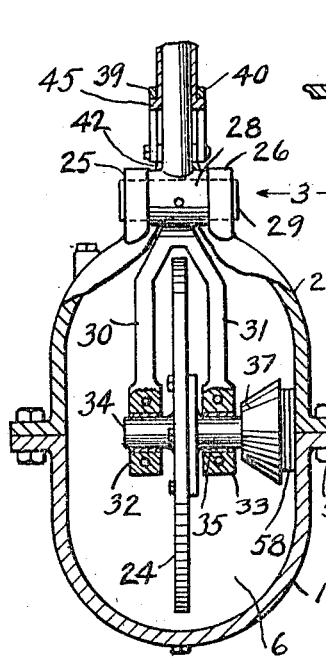
Fig. 2 is a vertical cross-section on the line 2—2 of Figs. 1 and 3.
Figures 3, 4:
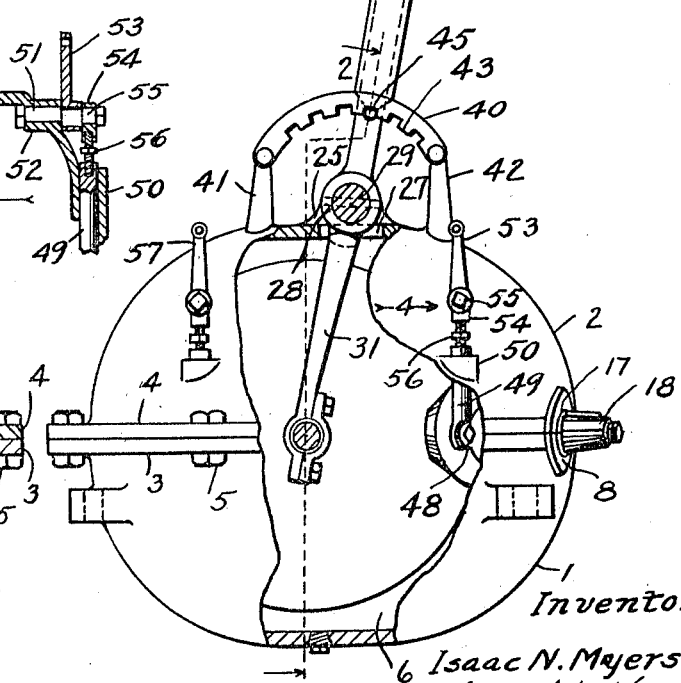
Fig. 3 is a side elevation taken in the direction indicated by the arrows 3 in Figs. 1 and 2, parts being broken away and shown in section.
Fig. 4 is a fragmentary detail as indicated by the arrow 4 in Fig. 3.

The gear case consists of the lower half 1 and the upper half 2 having meeting flanges 3 and 4 secured together by bolts 5 and forming a closed chamber 6. The vertical end faces 7 and 8 are parallel and ordinarily will be at right angles to the crank shaft of the engine. The half bearings 9, 10, 11 and 12 are formed integral with the lower half 1 of the gear case. The bearings 9 and 10 are in parallel lines slightly off-set relative to each other, the bearings 11 and 12 are in parallel lines slightly off-set relative to each other, the lines of the bearings 11 and 12 crossing the lines of the bearings 9 and 10 at angles of about sixty degrees. The driving shaft 13 is mounted in the bearing 9 and extends through the case, there being a seat 14 on its outer end for coupling to a crank shaft and a bevel friction gear 15 upon its inner end. The driven shaft 16 is mounted in an eccentric 17 in the bearing 10 and extends through the case and has a seat 18 upon its outer end for connection to the driven mechanism and a bevel friction gear 19 upon its inner end. The eccentric stub shaft 20 is mounted in the bearing 11 and a bevel friction gear 21 runs loosely upon the inner end of the stub shaft. The stub shaft 22 is mounted in the bearing 12 and a bevel friction gear 23 runs upon the inner end of this shaft.

The friction disk 24 fits between the friction gears 15 and 21, and 19 and 23. Bearings 25 and 26 extend upwardly from the upper half 2 of the case and an opening 27 is formed through the case between the bearings. A bearing 28 is mounted between the bearings 25 and 26 upon a pivot 29. Supporting arms 30 and 31 extend downwardly from the bearing 28 and have bearings 32 and 33 at their lower ends on each side of the friction disk 24. A pintle 34 extends from the disk 24 into the bearing 32. A stub shaft 35 has a flange 36 secured to the disk 24 and the stub shaft 35 extends through the bearing 33 in line with the pintle 34, and a reversing bevel friction gear 37 is fixed upon the stub shaft 35 in position to move into and out of contact with the friction gear 19.

A hand-lever 38 extends upwardly from the bearing 28, and the sectors 39 and 40 are mounted upon opposite sides of the lever 38 and secured to posts 41 and 42 extending upwardly from the upper half 2 of the case, said sectors having downwardly projecting teeth 43. A sleeve 44 is mounted upon the hand-lever 38 and teeth 45 extend outwardly from the lower end of the sleeve to engage the teeth 43 upon the sectors, the outer end of the sleeve 44 being closed to form a spring seat 46, and an expansive spring 47 is inserted between the seat 46 and the end of the hand-lever 38, the tension of the spring being exerted to throw the sleeve 44 outwardly and hold the teeth 45 in engagement with the teeth 43.

A crank 48 extends from the eccentric 17 and a link 49 extends upwardly from the crank through a bearing 50 in the case. An eccentric shaft 51 is mounted in the bearing 52 formed in the upper half 2 of the case, an operating lever 53 is fixed upon the shaft 51, a pitman head 54 is mounted upon the pitman pin 55 projecting from the shaft 51, and a turn-buckle screw 56 connects the head 54 to the link 49, so that by manipulating the lever 53 the friction gear 19 is moved to or from the disk 24. In a like manner the operating lever 57 is connected to the eccentric shaft 20 so that by operating the lever 57 the gear 21 is moved to or from the disk 24. A thrust bearing 58 is formed between the shaft 35 and the inner face of the case to support the pressure of the gear 37.

When the gear 21 is pressing against the disk 24 and pressing the disk against the gear 15, rotation of the crank shaft rotating the shaft 13 driving the friction gear 15 will rotate the disk 24. Then if the gear 19 is pressing the disk 24 against the gear 23 the shaft 16 will be driven to drive the mechanism connected thereto. By operating the levers 53 and 57 the gears 19 and 21 are loosened in their contact with the disk 24, then the hand-lever 38 is operated to move the center of the disk 24 to or from the gears 15 and 21 thereby bringing the point of contact between the gear 15 and the disk 24 farther from or closer to the center of the disk and thus increasing or decreasing the speed of the disk. Moving the disk relative to the gear 15 will correspondingly and oppositely change the distance between the center of the disk and the gear 19 and when the disk has been moved to the desired position the gears 21 and 19 are tightened so that the operation of the shaft 13 will drive the shaft 16 at the new speed. When it is desired to reverse the driven shaft 16 relative to the driving shaft 13 the disk 24 is moved to bring the friction gear 37 into contact with the gear 19 and to move the gear 19 out of contact with the disk.

The half bearings 9, 10, 11 and 12 in the lower half 1 of the case are duplicated in the upper half 2 of the case. The bevel friction gear 15 is the driving gear and the bevel friction gear 19 the driven gear, the friction gears 21 and 23 serving as supports to hold the friction disk 24 against the driving and driven gears. When the lever 57 is operated to move the eccentric shaft 20 and press the friction gear 21 against the disk 24 and press the disk 24 against the driving friction gear 15 the disk 24 is firmly gripped between the two friction gears and there is comparatvely no side thrust upon the disk, and likewise when the lever 53 is operated to operate the eccentric 17 and throw the friction gear 19 against the disk 24 and press the disk 24 against the friction gear 23 the disk is firmly gripped between the gears 19 and 23 and rotation of the disk will rotate the shaft 16.

I claim:

1. A gear case, a driving shaft rotatably mounted in the gear case, a driven shaft rotatably mounted in the gear case, a friction bevel gear fixed upon the driven shaft, a friction disk mounted to contact with the friction driving gear and the friction driven gear, and means for supporting the friction disk against the friction gears.

2. A gear case, a driving shaft rotatably mounted in the gear case, a driven shaft rotatably mounted in the gear case, a friction bevel gear fixed upon the driven shaft, a friction disk mounted to contact with the friction driving gear and the friction driven gear, means for supporting the friction disk against the friction gears, and means for moving the disk relative to the gears to vary the speed.

3. A gear case, a driving shaft rotatably mounted in the gear case, a driven shaft rotatably mounted in the gear case, a friction bevel gear fixed upon the driven shaft, a friction disk mounted to contact with the friction driving gear and the friction driven gear, means for supporting the friction disk against the friction gears, and a reversing friction gear carried by the disk to move to and from the driving friction gear.

4. A gear case, a driving shaft rotatably mounted in the gear case, a driven shaft rotatably mounted in the gear case, a friction bevel gear fixed upon the driven shaft, a friction disk mounted to contact with the friction driving gear and the friction driven gear, means for supporting the friction disk against the friction gears, and means for varying the friction pressure upon the disk.

5. A friction transmission gear comprising a gear case, a driving shaft rotatably mounted in the gear case, a driven shaft rotatably mounted in the gear case in a line parallel with the driving shaft, a driving bevel friction gear fixed upon the driving shaft, a driven bevel friction gear fixed upon the driven shaft, a two-faced friction disk mounted in contact with the driving and driven gears on the diagonal line relative to the lines of the shafts and crossing said lines, means for moving the disk to vary the speed of the driven shaft relative to the driving shaft, supporting friction gears in opposition to the driving and driven gears, and a reversing friction gear carried by the disk to move to and from the driven friction gear.

6. A friction transmission gear comprising a gear case, a driving shaft rotatably mounted in the gear case, a driven shaft rotatably mounted in the gear case in a line parallel with the driving shaft, a driving bevel friction gear fixed upon the driving shaft, a driven bevel friction gear fixed upon the driven shaft, a two-faced friction disk mounted in contact with the driving and driven gears on the diagonal line relative to the lines of the shafts and crossing said lines, means for moving the disk to vary the speed of the driven shaft relative to the driving shaft, supporting friction gears in opposition to the driving and driven gears, a reversing friction gear carried by the disk to move to and from the driven friction gear, means for tightening and loosening the pressure between the disk and the driving and driven gears.

In testimony whereof I have signed my name to this specification.

ISAAC N. MYERS.

Copies of this patent may be obtained for five cents each, by addressing the "Commissioner of Patents, Washington, D. C."